US 8,443,385 B1

(12) United States Patent
Schlack

(10) Patent No.: US 8,443,385 B1
(45) Date of Patent: *May 14, 2013

(54) SYSTEM AND METHOD FOR DELIVERING STATISTICALLY SCHEDULED ADVERTISEMENTS

(75) Inventor: John A. Schlack, Southampton, PA (US)

(73) Assignee: Prime Research Alliance E, Inc. (VG)

( * ) Notice: Subject to any disclaimer, the term of this patent is extended or adjusted under 35 U.S.C. 154(b) by 385 days.

This patent is subject to a terminal disclaimer.

(21) Appl. No.: 12/508,268

(22) Filed: Jul. 23, 2009

Related U.S. Application Data

(63) Continuation of application No. 11/626,206, filed on Jan. 23, 2007, now Pat. No. 7,584,490, which is a continuation of application No. 09/766,004, filed on Jan. 19, 2001, now Pat. No. 7,185, 353.

(60) Provisional application No. 60/229,156, filed on Aug. 31, 2000.

(51) Int. Cl.
H04N 7/10 (2006.01)
H04N 7/025 (2006.01)
H04N 7/16 (2006.01)
H04N 7/173 (2006.01)
G06F 3/00 (2006.01)

(52) U.S. Cl.
USPC ........ 725/35; 725/36; 725/9; 725/14; 725/16; 725/32; 725/46; 725/114; 725/115; 725/116; 725/131; 725/144; 725/138; 725/139; 725/151; 725/89; 725/10

(58) Field of Classification Search ............ 725/35, 725/42
See application file for complete search history.

(56) References Cited

U.S. PATENT DOCUMENTS 4,602,279 A 7/1986 Freeman
4,630,108 A 12/1986 Gomersall
4,930,011 A 5/1990 Kiewit
5,029,014 A 7/1991 Lindstrom (Continued)

FOREIGN PATENT DOCUMENTS

CA 2164608 12/1994
CA 2264392 1/1999

(Continued)

OTHER PUBLICATIONS

NCTA Technical Papers "Compressed Digital Commercial Insertion: New Technology Architectures for the Cable Advertising Business" 1992 8 pages.

(Continued)

Primary Examiner — Hunter B Lonsberry
Assistant Examiner — Christine Kurien
(74) Attorney, Agent, or Firm — The Belles Group, P.C.

(57) ABSTRACT

A system and method for scheduling advertisements in a television service network environment. An ad scheduler prepares an ad insertion schedule based on channel change statistical information and avail time information. The scheduler evaluates the statistical information, time durations between adjacent avails in a presentation stream, and the relatedness of market segments assigned to a plurality of advertisements. It schedules the ads into presentation stream groups based on this evaluation. The statistical ad scheduling allows the system to eliminate "forced" switching between multiple presentation streams, whereby system wears and malfunctions can be decreased.

15 Claims, 9 Drawing Sheets

U.S. PATENT DOCUMENTS

| | | | |
|---|---|---|---|
| 5,031,213 A | 7/1991 | Kawasaki |
| 5,099,319 A | 3/1992 | Esch |
| 5,155,591 A | 10/1992 | Wachob |
| 5,165,069 A | 11/1992 | Vitt |
| 5,201,010 A | 4/1993 | Deaton |
| 5,231,494 A | 7/1993 | Wachob |
| 5,271,626 A | 12/1993 | Llenas |
| 5,305,464 A | 4/1994 | Frett |
| 5,319,455 A | 6/1994 | Hoarty |
| 5,351,075 A | 9/1994 | Herz |
| 5,400,166 A | 3/1995 | Huber |
| 5,410,344 A | 4/1995 | Graves |
| 5,424,770 A | 6/1995 | Schmelzer |
| 5,425,100 A | 6/1995 | Thomas |
| 5,446,919 A | 8/1995 | Wilkins |
| 5,457,562 A | 10/1995 | Tremblay |
| 5,515,098 A | 5/1996 | Carles |
| 5,532,732 A | 7/1996 | Yuen |
| 5,534,911 A | 7/1996 | Levitan |
| 5,550,578 A * | 8/1996 | Hoarty et al. | 725/120 |
| 5,559,549 A | 9/1996 | Hendricks |
| 5,565,909 A | 10/1996 | Thibadeau |
| 5,574,860 A | 11/1996 | Perlman |
| 5,579,055 A | 11/1996 | Hamilton |
| 5,585,858 A | 12/1996 | Harper et al. |
| 5,592,551 A | 1/1997 | Lett |
| 5,600,364 A | 2/1997 | Hendricks |
| 5,600,366 A | 2/1997 | Schulman |
| 5,600,573 A | 2/1997 | Hendricks |
| 5,604,542 A | 2/1997 | Dedrick |
| 5,612,742 A | 3/1997 | Krause |
| 5,621,728 A | 4/1997 | Lightfoot |
| 5,621,812 A | 4/1997 | Deaton |
| 5,635,978 A | 6/1997 | Alten |
| 5,636,346 A | 6/1997 | Saxe |
| 5,644,723 A | 7/1997 | Deaton |
| 5,649,114 A | 7/1997 | Deaton |
| 5,650,994 A | 7/1997 | Daley |
| 5,652,615 A | 7/1997 | Bryant |
| 5,657,072 A | 8/1997 | Aristides |
| 5,659,367 A | 8/1997 | Yuen |
| 5,661,516 A | 8/1997 | Carles |
| 5,687,095 A | 11/1997 | Haskell |
| 5,694,176 A | 12/1997 | Bruette |
| 5,708,664 A | 1/1998 | Budge et al. |
| 5,724,091 A | 3/1998 | Freeman |
| 5,724,521 A | 3/1998 | Dedrick |
| 5,740,549 A | 4/1998 | Reilly |
| 5,752,160 A | 5/1998 | Dunn |
| 5,752,238 A | 5/1998 | Dedrick |
| 5,754,938 A | 5/1998 | Herz |
| 5,754,939 A | 5/1998 | Herz |
| 5,758,257 A | 5/1998 | Herz |
| 5,758,328 A | 5/1998 | Giovannoli |
| 5,761,601 A | 6/1998 | Nemirofsky |
| 5,774,170 A | 6/1998 | Hite |
| 5,781,226 A | 7/1998 | Sheehan |
| 5,784,523 A | 7/1998 | Quan et al. |
| 5,790,426 A | 8/1998 | Robinson |
| 5,790,935 A | 8/1998 | Payton |
| 5,801,747 A | 9/1998 | Bedard |
| 5,801,753 A | 9/1998 | Eyer |
| 5,805,974 A | 9/1998 | Hite |
| 5,808,694 A | 9/1998 | Usui |
| 5,812,790 A | 9/1998 | Randall |
| 5,815,671 A | 9/1998 | Morrison |
| 5,848,352 A | 12/1998 | Dougherty |
| 5,861,919 A | 1/1999 | Perkins |
| 5,862,140 A | 1/1999 | Shen |
| 5,864,823 A | 1/1999 | Levitan |
| 5,877,812 A | 3/1999 | Krause |
| 5,886,731 A | 3/1999 | Ebisawa |
| 5,912,696 A | 6/1999 | Buehl |
| 5,917,830 A | 6/1999 | Chen |
| 5,918,014 A | 6/1999 | Robinson |
| 5,926,205 A | 7/1999 | Krause |
| 5,931,901 A | 8/1999 | Wolfe |
| 5,948,061 A | 9/1999 | Merriman |
| 5,956,088 A | 9/1999 | Shen |
| 5,959,688 A | 9/1999 | Schein |
| 5,966,120 A | 10/1999 | Arazi |
| 5,969,715 A | 10/1999 | Dougherty |
| 5,978,381 A | 11/1999 | Perlman |
| 5,990,927 A | 11/1999 | Hendricks |
| 6,002,393 A | 12/1999 | Hite |
| 6,002,394 A | 12/1999 | Schein |
| 6,006,257 A | 12/1999 | Slezak |
| 6,009,409 A | 12/1999 | Adler |
| 6,009,410 A | 12/1999 | LeMole |
| 6,020,880 A | 2/2000 | Naimpally |
| 6,020,883 A | 2/2000 | Herz |
| 6,026,368 A | 2/2000 | Brown |
| 6,026,369 A | 2/2000 | Capek |
| 6,029,045 A | 2/2000 | Picco |
| 6,029,195 A | 2/2000 | Herz |
| 6,038,256 A | 3/2000 | Linzer |
| 6,055,510 A | 4/2000 | Henrick |
| 6,055,573 A | 4/2000 | Gardenswartz |
| 6,061,097 A | 5/2000 | Satterfield |
| 6,088,722 A | 7/2000 | Herz |
| 6,119,098 A | 9/2000 | Guyot |
| 6,130,726 A | 10/2000 | Darbee |
| 6,141,010 A | 10/2000 | Hoyle |
| 6,141,358 A | 10/2000 | Hurst, Jr. |
| 6,144,653 A | 11/2000 | Persson |
| 6,160,570 A | 12/2000 | Sitnik |
| 6,160,989 A | 12/2000 | Hendricks |
| 6,177,931 B1 | 1/2001 | Alexander |
| 6,181,334 B1 * | 1/2001 | Freeman et al. | 725/138 |
| 6,208,688 B1 | 3/2001 | Seo |
| 6,240,103 B1 | 5/2001 | Schoenblum |
| 6,252,634 B1 | 6/2001 | Yuen |
| 6,253,238 B1 | 6/2001 | Lauder |
| 6,263,501 B1 | 7/2001 | Schein |
| 6,292,786 B1 | 9/2001 | Deaton |
| 6,334,108 B1 | 12/2001 | Deaton |
| 6,357,042 B2 | 3/2002 | Srinivasan |
| 6,359,902 B1 | 3/2002 | Putzolu |
| 6,370,199 B1 | 4/2002 | Bock |
| 6,378,130 B1 | 4/2002 | Adams |
| 6,418,122 B1 | 7/2002 | Schoenblum |
| 6,424,998 B2 | 7/2002 | Hunter |
| 6,425,131 B2 | 7/2002 | Crandall |
| 6,434,747 B1 | 8/2002 | Khoo |
| 6,446,082 B1 | 9/2002 | Arita |
| 6,446,261 B1 | 9/2002 | Rosser |
| 6,456,234 B1 | 9/2002 | Johnson |
| 6,459,427 B1 | 10/2002 | Mao |
| 6,463,585 B1 * | 10/2002 | Hendricks et al. | 725/35 |
| 6,484,317 B1 | 11/2002 | Wright |
| 6,487,721 B1 | 11/2002 | Safadi |
| 6,493,875 B1 | 12/2002 | Eames |
| 6,505,169 B1 | 1/2003 | Bhagavath |
| 6,516,002 B1 | 2/2003 | Huang |
| 6,516,302 B1 | 2/2003 | Deaton |
| 6,571,279 B1 | 5/2003 | Herz |
| 6,583,825 B1 | 6/2003 | Yuen |
| 6,611,624 B1 | 8/2003 | Zhang |
| 6,615,039 B1 | 9/2003 | Eldering |
| 6,631,523 B1 | 10/2003 | Matthews, III |
| 6,637,029 B1 | 10/2003 | Maissel |
| 6,665,872 B1 | 12/2003 | Krishnamurthy |
| 6,675,385 B1 | 1/2004 | Wang |
| 6,684,194 B1 | 1/2004 | Eldering |
| 6,698,020 B1 | 2/2004 | Zigmond |
| 6,704,930 B1 | 3/2004 | Eldering |
| 6,718,551 B1 | 4/2004 | Swix |
| 6,724,974 B2 | 4/2004 | Naruto |
| 6,738,978 B1 | 5/2004 | Hendricks |
| 6,760,916 B2 | 7/2004 | Holtz et al. |
| 6,796,555 B1 | 9/2004 | Blahut |
| 6,820,062 B1 | 11/2004 | Gupta |
| 6,820,277 B1 | 11/2004 | Eldering |
| 7,003,792 B1 | 2/2006 | Yuen |
| 7,146,627 B1 | 12/2006 | Ismail et al. |
| 7,150,030 B1 | 12/2006 | Eldering |
| 7,185,353 B2 * | 2/2007 | Schlack | 725/35 |

| | | | |
|---|---|---|---|
| 7,222,354 B1 | 5/2007 | Ching et al. | |
| 7,584,490 B1 * | 9/2009 | Schlack | 725/35 |
| 2001/0013124 A1 | 8/2001 | Klosterman | |
| 2001/0014975 A1 | 8/2001 | Gordon et al. | |
| 2001/0025377 A1 | 9/2001 | Hinderks | |
| 2001/0049820 A1 | 12/2001 | Barton | |
| 2002/0026645 A1 | 2/2002 | Son | |
| 2002/0038455 A1 | 3/2002 | Srinivasan | |
| 2002/0083439 A1 | 6/2002 | Eldering | |
| 2002/0083442 A1 | 6/2002 | Eldering | |
| 2002/0083443 A1 | 6/2002 | Eldering | |
| 2002/0087975 A1 | 7/2002 | Schlack | |
| 2002/0087976 A1 | 7/2002 | Kaplan | |
| 2002/0104083 A1 | 8/2002 | Hendricks et al. | |
| 2002/0129374 A1 | 9/2002 | Freeman | |
| 2002/0188943 A1 | 12/2002 | Freeman | |
| 2002/0194589 A1 * | 12/2002 | Cristofalo et al. | 725/32 |
| 2003/0088872 A1 | 5/2003 | Maissel | |
| 2003/0093792 A1 | 5/2003 | Labeeb | |
| 2003/0135853 A1 | 7/2003 | Goldman | |
| 2003/0200128 A1 | 10/2003 | Doherty | |
| 2004/0163101 A1 | 8/2004 | Swix et al. | |

FOREIGN PATENT DOCUMENTS

| | | |
|---|---|---|
| CA | 2151458 | 2/2004 |
| EP | 1220542 | 7/2002 |
| WO | WO9712486 | 4/1997 |
| WO | WO9717774 | 5/1997 |
| WO | WO9827723 | 6/1998 |
| WO | WO9856128 | 12/1998 |
| WO | WO9901984 | 1/1999 |
| WO | WO9904561 | 1/1999 |
| WO | WO9911065 | 3/1999 |
| WO | WO9926415 | 5/1999 |
| WO | WO 9926415 A1 * | 5/1999 |
| WO | WO9952285 | 10/1999 |
| WO | WO9955066 | 10/1999 |
| WO | WO9960789 | 11/1999 |
| WO | WO9965237 | 12/1999 |
| WO | WO9966719 | 12/1999 |
| WO | WO0005888 | 2/2000 |
| WO | WO0014951 | 6/2000 |
| WO | WO0033224 | 6/2000 |
| WO | WO0033233 | 6/2000 |
| WO | WO 0033233 A1 * | 6/2000 |
| WO | WO0049801 | 8/2000 |
| WO | WO0054504 | 9/2000 |
| WO | WO0069163 | 11/2000 |
| WO | WO0147279 | 6/2001 |
| WO | WO0064166 | 4/2002 |
| WO | WO0233973 | 4/2002 |
| WO | WO0233975 | 4/2002 |

OTHER PUBLICATIONS

AdLink Engineering, Ad insertion wiring diagrams, 1999, 17 pages.

Unpublished, abandoned U.S. Appl. No. 09/635,539, filed Aug. 10, 2000. First named inventor: Charles A. Eldering.

Unpublished, abandoned U.S. Appl. No. 09/635,542, filed Aug. 10, 2000. First named inventor: Charles A. Eldering.

U.S. Appl. No. 09/712,790, filed Nov. 14, 2000. First named inventor: Charles A. Eldering.

* cited by examiner

| NETWORK | UPCI | AVAIL TIME RANGE | AD | SEGMENT | BPID |
|---|---|---|---|---|---|
| MTV | 05 | 20:01:00-20:18:00 | JOE'S BAR AND GRILL 1 | COLLEGE OR WEALTHY | 178 |
| MTV | 05 | 20:01:00-20:18:00 | KIM'S COSMETICS 1 | WOMEN | 185 |
| MTV | 05 | 20:01:00-20:18:00 | JOE'S BAR AND GRILL 3 | ELDERLY | 100 |
| MTV | 05 | 20:18:00-20:44:00 | JOE'S BAR AND GRILL 2 | BLUE COLLAR | 145 |
| MTV | 05 | 20:18:00-20:44:00 | MOE'S TAVERN 2 | YOUNG PEOPLE | 122 |
| MTV | 05 | 20:18:00-20:44:00 | BILL'S AUTO 1 | WEALTHY AND ELDERLY | 197 |

Fig. 9

SYSTEM AND METHOD FOR DELIVERING STATISTICALLY SCHEDULED ADVERTISEMENTS

CROSS REFERENCE TO RELATED APPLICATIONS

This application is a continuation of U.S. patent application Ser. No. 11/626,206, filed Jan. 23, 2007 now U.S. Pat. No. 7,584,490, and entitled System and Method for Delivering Statistically Scheduled Advertisements, which is a continuation of U.S. patent application Ser. No. 09/766,004, filed Jan. 19, 2001 (now U.S. Pat. No. 7,185,353), and entitled System and Method for Delivering Statistically Scheduled Advertisements, the entire disclosures of which are incorporated herein by reference.

This patent application claims the benefit U.S. Provisional Patent Application No. 60/229,156 filed on Aug. 31, 2000, entitled Method and System for Addressable and Program Independent Advertising, the entire disclosure of which is incorporated herein by reference.

BACKGROUND OF THE INVENTION

The present invention relates to targeted television advertising and, more particularly, to a system and method for delivering statistically scheduled advertisements in multiple presentation streams to subscribers in a television service network.

In conventional "program-linked" television advertising, each advertisement is linked to a particular television program so that all viewers viewing the particular program see the same advertisements linked to that program. Viewers who are not viewing that program will not see the advertisements linked to that program. In such program-linked advertising, the advertisements are simply part of the data stream from the head end, i.e., from the central office of the television service provider, to all subscribers of that service.

However, with modern digital television service systems, such as digital cable systems, DBS (Digital Broadcast Satellite) systems, and SDV (Switched Digital Video) systems, more personalized television service is possible. For instance, in DBS and SDV systems, individual subscriber households can be addressed selectively through set top boxes or STBs. In digital cable systems, a group of subscriber households can be selectively addressed through a cable node serving that group. For this reason, STBs and cable nodes are also referred to herein as addressable units. Through the addressable units, the television service provider can send different data to different subscribers or groups of subscribers.

The selective addressability of these modern digital television service systems renders more targeted television advertising possible. In accordance with one targeted television advertising method, ads that have been prepared to interest a particular subscriber of the television service network may be inserted into ad spots or "avails" of the television presentation stream at the particular subscriber's device (e.g., a set top box). As a result, subscribers at different households will see different advertisements that are particularly directed to each subscriber even though they are viewing the same programming. PCT Patent Publication No. WO 99/66719 entitled "Techniques for Intelligent Video Ad Insertion," which is herein incorporated by reference, discloses at least one such scheme. Other such schemes are discussed in aforementioned Provisional Patent Application No. 60/229,156, owned by the same assignee of the present invention.

Although these systems provide effective means to deliver targeted ads to the subscribers, in some applications, it may be desirable to have a system which delivers targeted ads to the subscribers without the ad insertion occurring at the subscriber's STB. Applicant's co-pending U.S. patent application Ser. No. 09/750,800, filed on Dec. 28, 2000 entitled "System and Method for Delivering Targeted Advertisements using Multiple Presentation Streams," which is herein fully incorporated by reference, discloses such a system.

In the system of Applicant's co-pending application Ser. No. 09/750,800 filed on Dec. 28, 2000 entitled "System and Method for Delivering Targeted Advertisements Using Multiple Presentation Streams", a television presentation stream corresponding to a particular programming channel is "replicated" to produce a plurality of presentation streams, collectively referred to herein as a presentation stream group. The system produces a plurality of such presentation stream groups each corresponding to one of a plurality of programming channels. All the presentation streams in a presentation stream group have the same programming and the same avails at the same locations. Each single presentation stream in the group carries in its avails a plurality of advertisements each directed to a different advertiser-specific market segment. This is necessary if the system were to use advertiser-specific market segments, i.e., market segments that have been uniquely defined by each advertiser. According to this arrangement, however, a subscriber viewing the same presentation stream will likely view ads that are inappropriate for that subscriber since a single presentation stream can carry ads directed to vastly different market segments.

To address this problem, the system of Applicant's co-pending application Ser. No. 09/750,800 filed on Dec. 28, 2000 entitled "System and Method for Delivering Targeted Advertisements Using Multiple Presentation Streams" "forces" switching between the presentation streams in the presentation stream group to select a presentation stream that is most appropriate for the subscriber at any given time. This "forced" switching is triggered every time an avail or a cue tone indicative of an avail is detected. Thus, the use of "forced" switching can increase system wear and malfunctions. Accordingly, a technique is desired which avoids the use of "forced" switching to deliver ads directed to different advertiser-specific market segments to the subscribers in a most targeted manner.

In view of the foregoing, it is an object of the present invention to provide a system and method which delivers targeted television advertising via a network without the use of "forced" presentation stream switching.

It is another object of the present invention to provide a system and method for scheduling advertisements in the presentation stream group based on channel change statistics and avail time information.

SUMMARY OF THE INVENTION

The present invention delivers advertisements directed to advertiser-specific market segments to the subscribers of a television service network in a targeted manner without the use of "forced" switching between multiple presentation streams.

In accordance with the present invention, a plurality of presentation stream groups are produced, each corresponding to a particular programming channel. A presentation stream group is composed of replicated presentation streams that are generated by "copying" one presentation stream corresponding to a particular programming channel. Thus, all the presentation streams in a presentation stream group have the same programming and the same avails at the same locations, into which different ads will be inserted in the different presentation streams.

The scheduling of the advertisements into the presentation streams is carried out according to certain criteria predetermined based on channel change statistics. The channel change statistics identify the probabilistic percentages of viewers/subscribers who would likely change their television channels during different time durations. By evaluating these channel change percentages, the system or system operator selects at least one particular time duration (e.g., X minutes) that corresponds to an acceptable channel change percentage. The selected time duration is then used as a threshold value to which time durations between avails in a presentation stream are compared. According to the criteria for scheduling the advertisements and based on the probabilistic assumption that any given viewer has changed channels, if a time duration between two adjacent avails in a presentation stream is greater than or equal to the threshold value, ads directed to different market segments (which can be significantly different) can be inserted respectively into these avails; and if a time duration between two adjacent avails in a presentation stream is less than the threshold value (i.e., avails are more closely located to each other), ads directed to similar market segments are inserted respectively into these avails.

The presentation stream groups carrying the scheduled advertisements are delivered to a plurality of local routing stations. Depending on the type of system, the routing station may reside at a set top box (e.g., for DBS or digital/analog cable system) or a Universal Service Access Multiplexer (USAM) device (e.g., for SDV). Only in response to a channel selection by a viewer/subscriber, the routing station detects (e.g., by detecting cue tones) an ad/avail location in the presentation stream group corresponding to the requested channel and determines which one of the presentation streams in that group is most appropriate for viewing by the viewer. This determination may involve identifying a presentation stream that is carrying an ad directed to a market segment that best matches the demographics or other characteristics of the viewer. The identified presentation stream is displayed to the viewer on the viewer's display or TV.

Thus, the present invention provides targeted television advertising by the use of channel change statistics and switching between presentation streams only in response to a viewer's channel change requests. If a time elapsed from the viewer's last channel change is relatively short (e.g., less than the threshold value), then the viewer will likely view a series of ads that are directed to similar market segments, whereby targeted advertising is achieved. On the other hand, if a time elapsed from the viewer's last channel change is long (e.g., greater than or equal to the threshold value), then the channel change statistics indicate that the viewer would likely have changed his or her channel by this time and the channel change would have triggered switching between presentation streams to select the most appropriate presentation stream for the viewer. In this manner, the viewer will likely view the most appropriate ads at any given time.

BRIEF DESCRIPTION OF THE DRAWINGS

FIG. 9 is an example of a table of scheduled/inserted ads which may be used in the present invention.

DETAILED DESCRIPTION OF THE PREFERRED EMBODIMENTS

Figure 1:
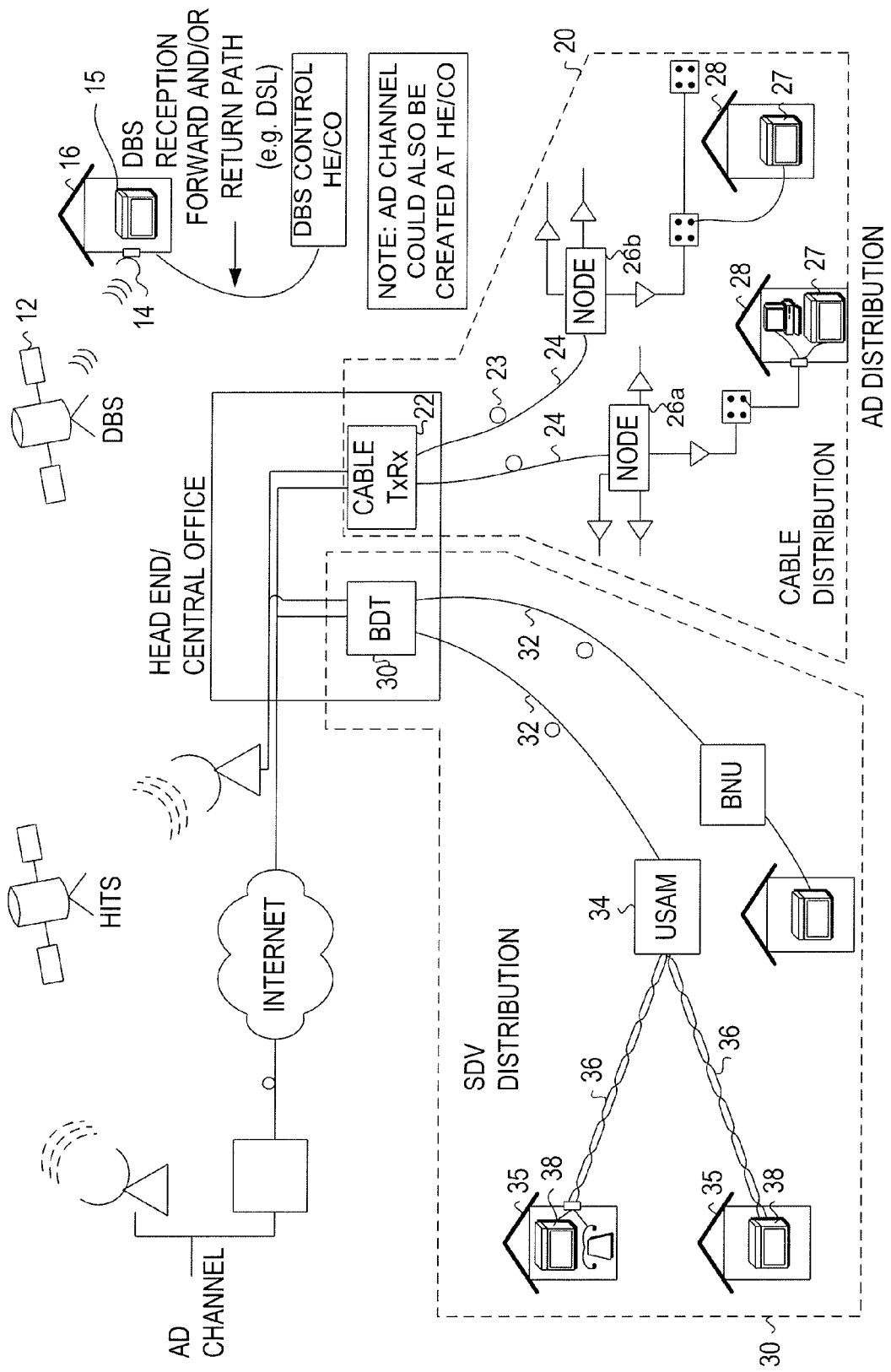
FIG. 1 is a block diagram of exemplary television service communication network environments in which the present invention may be practiced.

FIG. 1 is a block diagram of various television service delivery network environments in which the present invention may be practiced. Three of the most common types of television service delivery networks are illustrated in FIG. 1, namely, (1) a Digital Broadcast Satellite (DBS) network system, (2) a digital/analog cable network system, and (3) a Switched Digital Video (SDV) network system.

In a DBS system, a programming stream comprising upwards of a hundred channels of television programming is delivered directly from a geo-stationary satellite transmitter 12 orbiting the earth to a receiving antenna 14 mounted on or near each subscriber's house and from the antenna via a cable to a satellite receiving station 15 in the subscriber's house 16. The satellite receiving station 15 (which is a form of STB) receives the channels of programming, selects a requested channel and demodulates the signal for delivery to a monitor (e.g., a television, not shown). The DBS network can direct different programming data to different set top boxes 15 or groups of set top boxes 15 such that the set top boxes 15 are selectively addressable by the DBS network. Most DBS systems are arranged such that data can also be sent in the upstream direction, that is, from the set top box 15 to the DBS provider. In most DBS systems, the set top box 15 also is coupled to the telephone line and is designed and programmed to place telephone calls to the DBS service provider to periodically send information in the upstream direction. Such information, for example, may comprise requests for Pay-Per-View programs or requests for changes in the subscription (a request that one or more of premium channels be added to the service, etc.).

In a typical digital/analog cable network 20, multiple channels of television information are transmitted from a head end or central office 22 via a cable network 23. Particularly, the channels are transmitted via cables 24 to nodes 26. The nodes 26 are essentially switching/routing stations which service multiple homes (usually a few hundred). The nodes 26 route the signals to individual subscribers 28. The individual subscriber will have set top boxes 27 that select a particular channel from the transmit stream, demodulate it and forward it for display on one or more monitors or televisions (not shown). Different data streams or signals can be sent to the different nodes 26 of the network such that households coupled to the node 26a can receive different programming than households coupled to the node 26b. Thus, such systems are addressable by node, but not by individual subscriber.

Upstream information may be sent from the set top box to the central office via a dedicated upstream channel over the cable. In cable systems that do not support two-way communication, the upstream "channel" can be through the telephone as described above in connection with DBS systems.

In accordance with a third type of system, namely, SDV system 30, television programming is transmitted over the regular telephone network. In this system, each individual subscriber household may be addressable. For instance, television signals are transmitted from a central office 30 via wire, typically fiber optic cable 32, to a Universal Service Access Multiplexer (USAM) device 34 which then delivers the data to multiple individual subscriber households 35 via regular telephone twisted wire pair 36 using modems (e.g., VDSL modems). The USAM device 34 receives a wide bandwidth signal comprising some or all of the television channels. However, because of the bandwidth limitations of twisted pair wire, typically only about one channel of television programming at a time can be delivered from the USAM to the household. Accordingly, the subscriber has a set top box 38 that is similar in functionality to the set top box of a digital cable system or DBS system, except that when the viewer changes channels, the STB transmits a request to the USAM device 34, which switches the channel for the viewer and begins sending the newly selected channel to the household. Typically, the channel selection signal from the viewer is known as a UPCI (User Perceived Channel Indicator) which the USAM device 34 converts into an appropriate BpID (Broadcast Program ID) and uses to send data corresponding to the BpID to the viewer's STB. SDV systems are essentially fully modern asynchronous two-way communication networks. Thus the set top box can transmit information upstream via the same VDSL modem that receives the downstream signals. SDV systems generally operate using asynchronous transfer mode (ATM) protocol which is well known in the networking arts.

A preferred embodiment of the present invention will now be described. In accordance with the preferred embodiment, a plurality of presentation stream groups are produced each corresponding to a particular programming channel. A presentation stream group is composed of multiple presentation streams that are generated by "copying" one presentation stream corresponding to a particular programming channel. Thus, all the presentation streams in a presentation stream group have the same programming and the same avails at the same locations. A television service provider may determine how many presentation streams can exist in each presentation stream group. Generally, because of the bandwidth limitations imposed on the programming channels, only a limited number of presentation streams (e.g., 3-7) may exist in a presentation stream group.

In accordance with the present invention, each advertiser defines its own set of advertiser-specific market segments for addressing targeted ads. Applicant's co-pending U.S. patent application Ser. No. 09/731,606 filed on Dec. 7, 2000 entitled "System for Providing Targeted Advertisements using Advertiser-Specific Target Groups," which is herein fully incorporated by reference, discloses examples of systems and methods for forming advertiser-specific market segments, which may be used in the present invention. Since the total number of different advertiser-specific market segments will typically exceed the limited number of presentation streams allowed per presentation stream group, each single presentation stream will need to carry ads directed to different advertiser-specific market segments.

Figure 2:
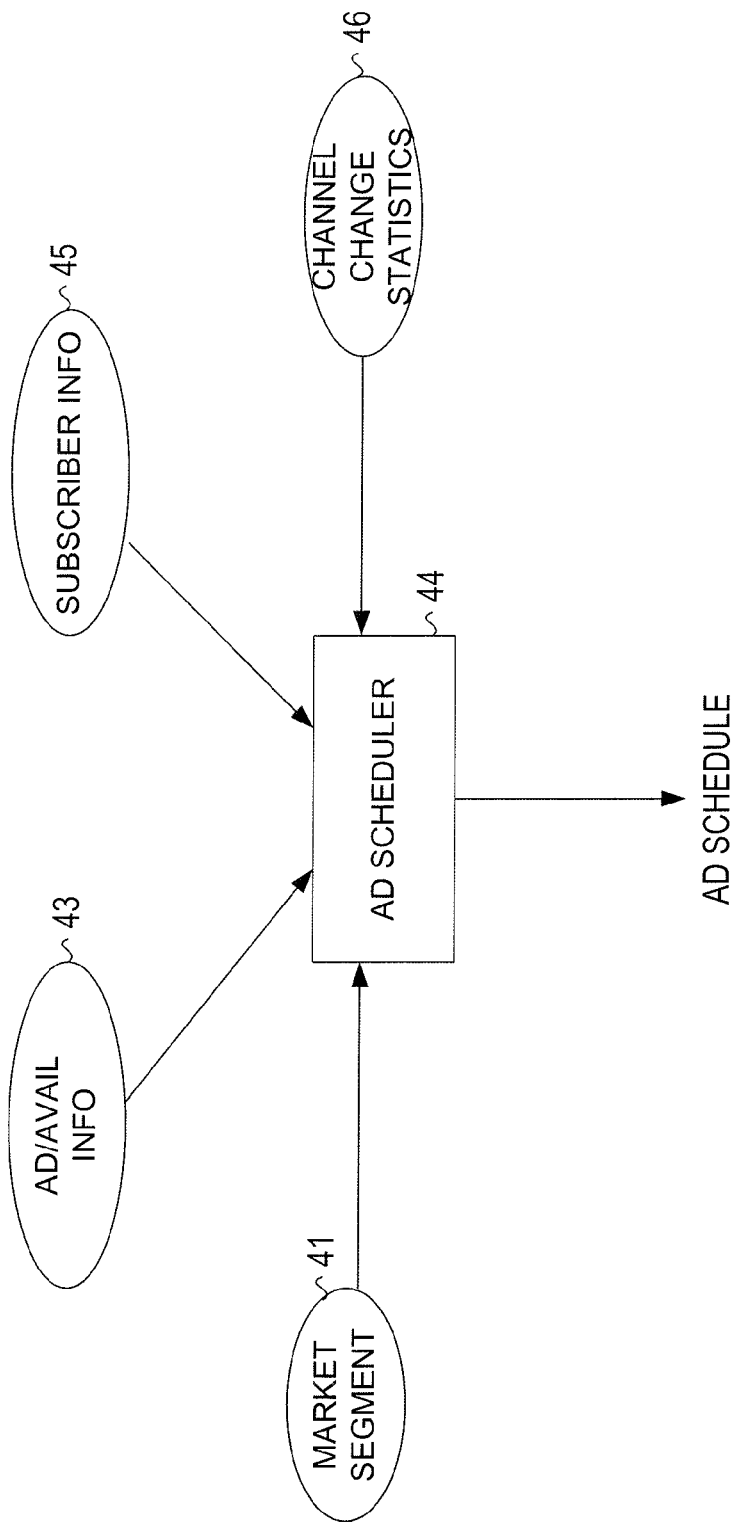
FIG. 2 is a diagram of an ad scheduler according to one embodiment of the present invention.

The scheduling of these ads directed to different advertiser-specific market segments into the avails of each presentation stream according to the present invention will now be described. FIG. 2 shows a block diagram of an ad scheduler 44 according to the present invention. As shown in FIG. 2, the ad scheduler 44 generates an ad schedule for inserting ads into the avails of each presentation stream in the presentation stream groups. Generally, the scheduler 44 would reside at the head end of the system.

In scheduling the ads, the ad scheduler 44 relies on market segment information 41, ad/avail information 43, subscriber information 45, and channel change statistics 46. The subscriber information 45 may identify all or groups of subscribers on the network and their demographics or other characteristics. The market segment information 41 may identify a list of advertiser-specific market segments created in the system and their characteristics. The ad/avail information 43 may identify a list of ads to be scheduled as well as avail time information such as avail sizes, time durations between adjacent avails in a presentation stream, ad insertion window times, etc. The scheduler 44 correlates this information 41, 43 and 45 to identify a list of ads to be scheduled and the market segments associated with the ads, and a list of subscribers or subscriber groups and the market segments to which they belong (which may be used at the local routing level, e.g., STB, USAM, etc.). In one embodiment, individual subscribers may be identified by the MAC IDs of subscribers' STBs and, in digital cable systems, groups of subscribers may be identified by cable node numbers.

Figure 3:
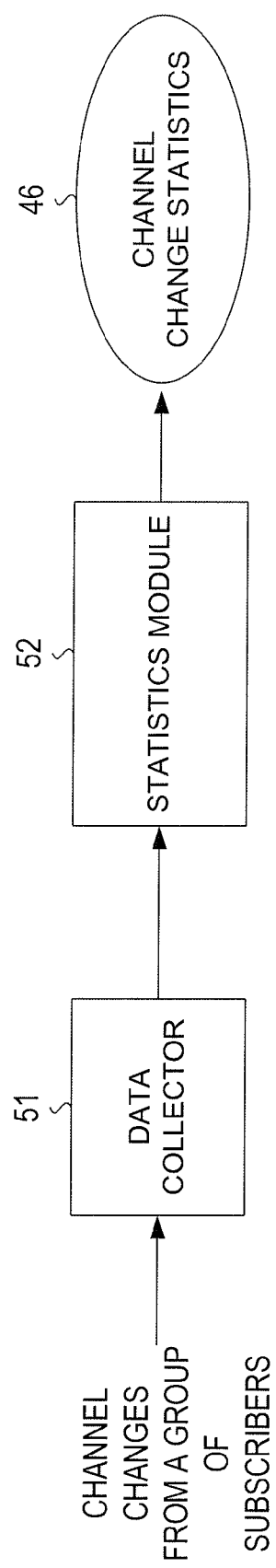
FIG. 3 is a diagram of a device for generating channel change statistics according to one embodiment of the present invention.

The channel change statistics 46 identify an average channel change frequency for subscribers/viewers on the network and other statistical data pertaining to the channel change habits of the subscribers, such as standard deviations, distribution types. The statistics 46 also indicates an average viewing time for each channel/program, which is the reciprocal of the average channel change frequency. It further indicates different percentages of viewers on the network who would likely change their channels during different time durations. A device as shown in FIG. 3 can be used to generate the channel change statistics 46 utilized in the ad scheduling process of the present invention. This device may be located at a STB or at the head end. If the device is located at the STB, the raw channel change data collected by the STB may be kept within the STB for security reasons, and the STB may only communicate the final outcome (i.e., the change statistics 46) to the head end so that the head end can use it to schedule the ads for insertion.

In the device shown in FIG. 3, a data collector 51 monitors the channel change habits of a group of subscribers on the network during a predetermined time period and collects channel change data from these subscribers. This can be easily achieved in two-way communication systems such as SDV. Also any of the well-known methods for determining the channel to which a TV is tuned, can be used to collect the channel change data. For maximum efficiency, this data can be collected by day part since channel change frequencies may differ significantly based on the time of day. A statistics module 52 receives the channel change data from the data collector 51 and performs statistical calculations on it to generate the channel change statistics 46, such as an average channel change frequency, a standard deviation, a distribution type, etc.

By evaluating the channel change percentages identified in the statistics 46, the ad scheduler 44 or system operator selects at least one particular time duration (e.g., X minutes) that corresponds to an acceptable channel change percentage. The selected time duration is then used as a threshold value to which each time duration between two adjacent avails in a presentation stream is compared. According to the criteria for scheduling the advertisements, if a time duration between two adjacent avails in a presentation stream is greater than or equal to the threshold value, ads directed to different market segments can be inserted respectively into these avails since most viewers/subscribers would likely have changed their channels during this time duration. The channel change would have triggered selection of the most appropriate presentation stream from the presentation stream group corresponding to the newly selected channel, as described later in more detail. However, if the time duration between the adjacent avails is less than the threshold value (i.e., avails are more closely located to each other), ads directed to similar market segments are inserted respectively into these avails since the viewers would less likely have changed their channels during this time duration, i.e., they would be viewing the same presentation stream.

Figure 4A:
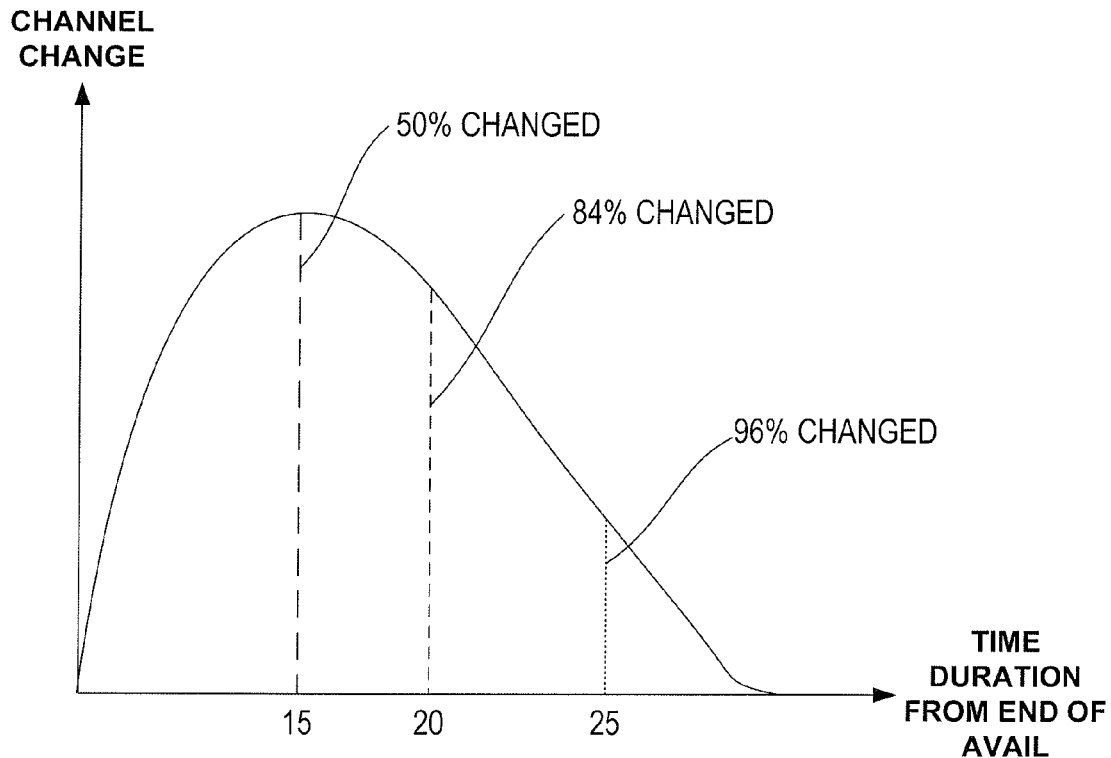
FIG. 4A is an example of a normal distribution graph depicting exemplary channel change statistical data according to the present invention.
Figure 4B:
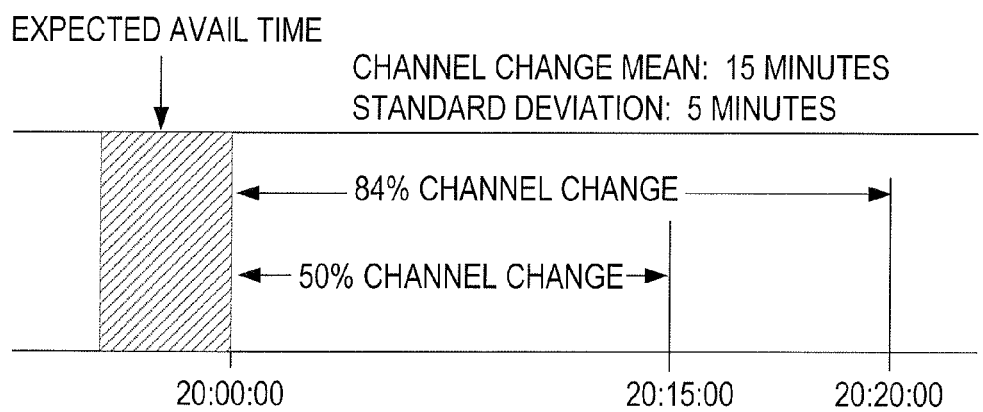
FIG. 4B is a diagram of a presentation stream representing the channel change statistical data of FIG. 4A.
Figure 5:
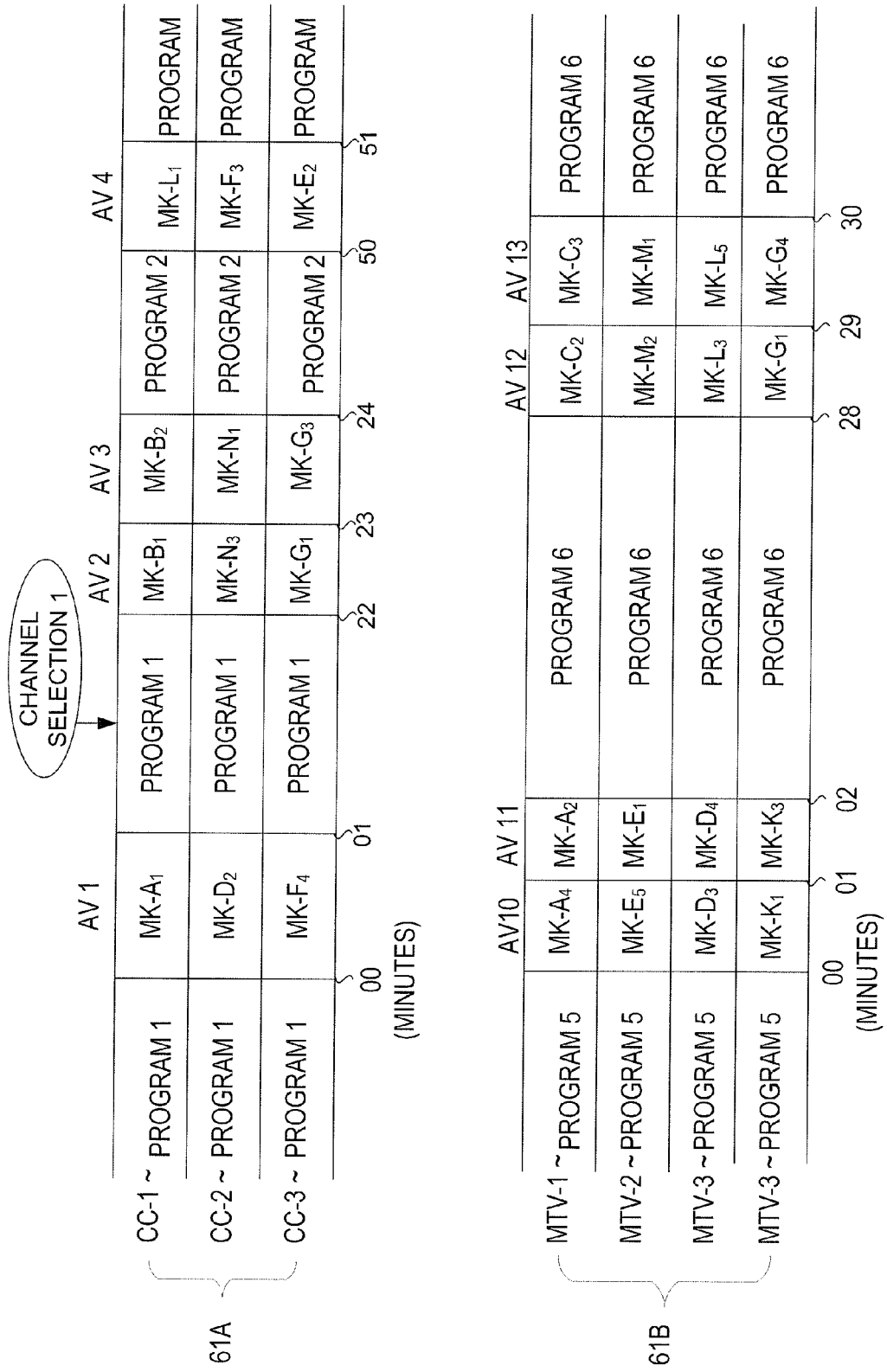
FIG. 5 is a diagram of two exemplary presentation stream groups according to the present invention.

Now, having described the principles of ad scheduling of the present invention, an example is now provided referring to FIGS. 4A, 4B and 5. FIGS. 4A and 4B respectively illustrate a graph and a diagram depicting exemplary channel change statistics 46. As shown in FIGS. 4A and 4B, the channel change statistics 46, in this example, indicate that the channel change data manifest a normal distribution with the average channel change rate of 15 minutes and a standard deviation of 5 minutes. This indicates that 50 percent of the viewers/subscribers would likely change their channels during a 15-minute time span, 84 percent of the viewers would likely change their channels during a 20-minute time span (one standard deviation), and 96 percent of the viewers would likely change their channels during a 25-minute time span (two standard deviations). In relying on this data, the ad scheduler 44 or system operator may select "20 minutes" as a threshold value (if 84% is an acceptable channel change percentage). Obviously, other threshold values can be selected if desired.

Then the threshold value is compared to time durations between adjacent avails in the presentation stream groups. For the purpose of explaining this process, FIG. 5 is provided which illustrates two exemplary presentation stream groups 61a and 61b. The first presentation stream group 61a is composed of replicated presentation streams (CC-1, CC-2 and CC-3) corresponding to "Comedy Central" or CC channel. The second presentation stream group 61b is composed of replicated presentation streams (MTV-1, MTV-2, MTV-3 and MTV-4) corresponding to "MTV" channel. Obviously, other presentation stream groups may exist. Also, it should be noted that all the presentation streams in each presentation stream group 61a, 61b have the same programming and the same avails at the same locations as discussed hereinabove. For instance, each presentation stream in the first presentation stream group 61a has the same programs (e.g., Program 1, Program 2) and the same avails (e.g., Av1, Av2, Av3, Av4) at the same locations.

As shown in FIG. 5, the ad scheduler 44 determines, e.g., from the avail information 43, that a time duration of 21 minutes exists between the scheduled avails Av1 and Av2, 0 minute between avails Av2 and Av3, 26 minutes between avails Av3 and Av4, and so on. In accordance with one embodiment, this determination can be made by calculating the time difference between scheduled times of adjacent avails in the presentation streams. Since the time duration between avails Av1 and Av2 is 21 minutes which is greater than the threshold value of 20 minutes, a market segment (MK-$A_1$) is assigned to avail Av1 and a market segment (MK-$B_1$) that is significantly different from the previous market segment (MK-$A_1$) is assigned to avail Av2. On the other hand, since the time duration between avails Av2 and Av3 is 0 minute, a market segment (MK-$B_2$) that is similarly related to the previous market segment (MK-$B_1$) is assigned to avail Av3. Since the time duration between avails Av3 and Av4 is 26 minutes which is greater than the threshold value of 20 minutes, a market segment (MK-$L_1$) that is significantly different from the previous market segment (MK-$B_2$) is assigned to avail Av4. In this manner, the avails of all the presentation streams in the first group 61a, the second group 61b and other presentation stream groups are assigned to different advertiser-specific market segments. Once the assignment of the market segments is completed, the advertisements that correspond to the assigned market segments are inserted correspondingly into the avails. If a viewer's channel selection 1 for requesting "CC" channel occurs before avail Av2 as shown in FIG. 5, the routing station (FIG. 7) examines the market segments/ads assigned to avail Av2 and selects one of the presentation streams having the market segment/ad that is most appropriate for the viewer.

Figure 6:
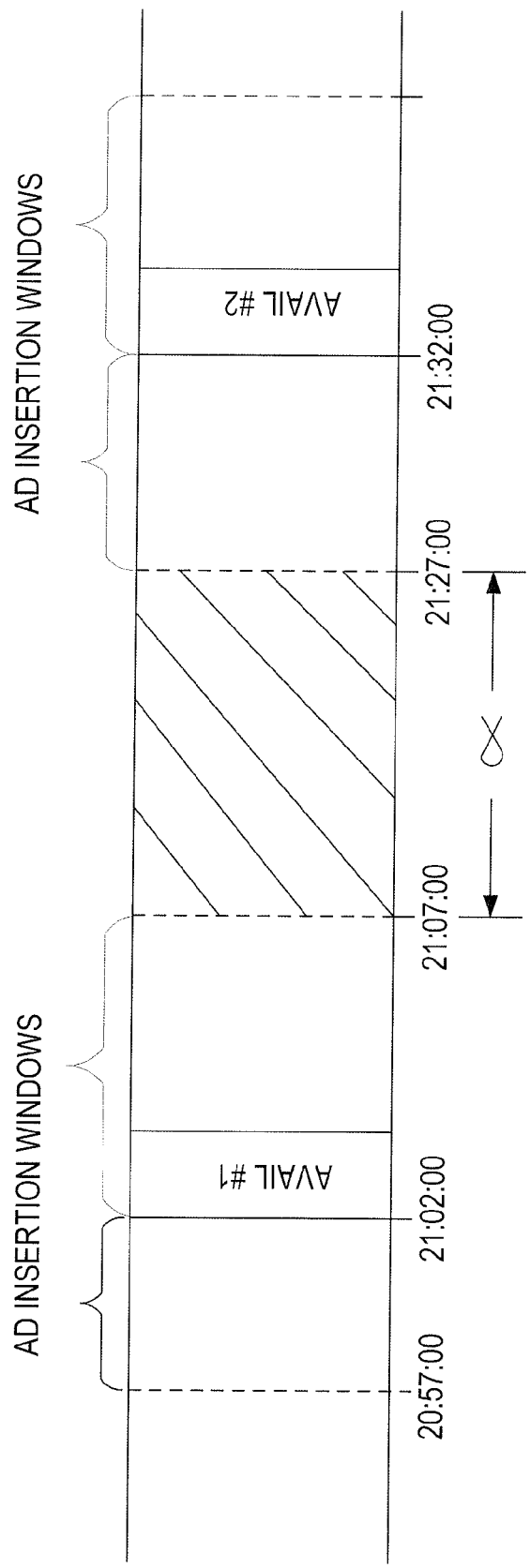
FIG. 6 is a diagram of a presentation stream depicting ad insertion windows.

In some embodiments, avails may not fall exactly on the scheduled times since the programs segments can vary slightly in length. Also, avails may be offset by certain amounts from their scheduled times in certain special circumstances, such as live events (particularly live sports events) where the avail locations are estimated. In such embodiments, a time duration "•" between the end of an ad insertion window of an avail and the start of an ad insertion window of the next avail may be used in lieu of the time difference between scheduled times of adjacent avails. An ad insertion window in the television art is known to be a window of time located on either side of the start of an avail, during which an ad insertion unit may anticipate the arrival of a cue tone or other ad insertion indicator known in the art. To better understand, FIG. 6 shows an example of an ad insertion window of 5 minutes on either side of the start of the expected avail (Avail #1 or Avail #2), wherein the window time is measured from the start of the expected avail. The time duration • represents the elapsed time between the two ad insertion windows of adjacent avails. Therefore, in these embodiments, instead of using the time difference between the scheduled times of adjacent avails, the time duration • may be used as the time duration between adjacent avails to schedule the advertisements in the presentation streams.

In accordance with one embodiment, each market segment characteristic identified in a market segment can be assigned with a characteristic number (e.g., "wealthy" characteristic may be assigned with the number 7), so that each market segment may have at least one characteristic number assigned to it. Then the characteristic numbers in one market segment may be compared to the characteristic numbers in another market segment to determine a degree of "relatedness" between these market segments, e.g., by determining if any of the characteristic numbers in one market segment is also present in other market segments. This comparison result indicates how similar or different the advertiser-specific market segments may be and can be used to assign the market segments in the avails of the presentation stream groups.

In accordance with another embodiment, instead of assigning market segments to the avails, each advertisement may be given one market segment number based on its market segment characteristics, and these numbers can be compared to each other to determine how similar or different the market segments of the ads may be. Then the advertisements will be inserted into the avails based on this comparison results. Other methods of determining the relatedness of market segments are possible and can be used in the present invention.

Figure 7:
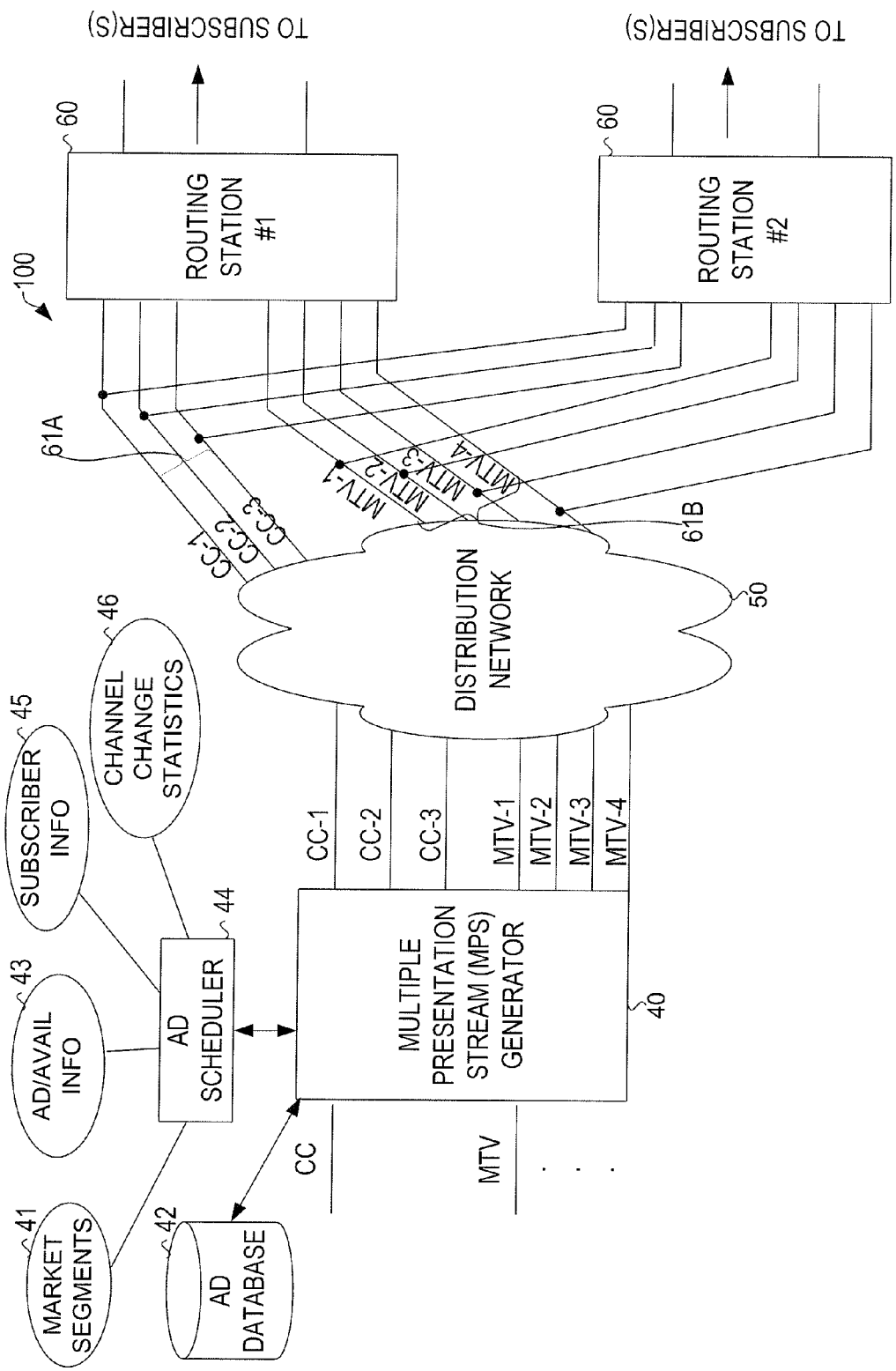
FIG. 7 is a block diagram of an advertisement delivery system in accordance with the present invention.

FIG. 7 shows a block diagram of an advertisement delivery system 100, including the scheduler 44 of FIG. 2, according to a preferred embodiment of the present invention. The advertisement delivery system 100 may be implemented in any of the television service delivery networks (e.g., SDV, digital cable TV, DBS shown in FIG. 1). Although only two presentation stream groups 61a and 61b are specifically illustrated for the sake of clarity, it is understood that other or additional presentation stream groups may exist.

As illustrated in FIG. 7, the advertisement delivery system 100 includes an ad database 42 for storing a library of advertisements to be inserted into the avails of the presentation stream groups, the ad scheduler 44 for producing an ad schedule according to the scheduling discussed above, a multiple presentation stream (MPS) generator 40 for generating the presentation stream groups (e.g., 61a and 61b) carrying ads directed to different advertiser-specific market segments according to the ad schedule, a distribution network 50 for distributing the presentation stream groups, and a plurality of local routing stations 60,60 for receiving the presentation stream groups through the network 50 and delivering one of the presentation streams in a presentation stream group according to channel requests by the subscribers/viewers on the network. These components are all operatively coupled. In some embodiments, the MPS generator 40 may be located at the head end of the system, and the routing stations 60,60 may be located at the local distribution points, e.g., at STBs for analog/digital cable TV systems and satellite systems such as DBS, USAM devices for SDV systems, etc. In other embodiments, both the MPS generator 40 and the routing stations 60, 60 may be located at the head end of the system.

The MPS generator 40 receives a presentation stream corresponding to each programming channel from a program source or the like. In this example, the MPS generator 40 receives a presentation stream "CC" corresponding to "Comedy Central" channel, and a presentation stream "MTV" corresponding to "MTV" channel. The MPS generator 40 "replicates" these presentation streams to produce the first and second presentation stream groups 61a and 61b according to the number of presentation streams allotted per presentation stream group. It should be noted that different numbers of presentation streams may be present in different presentation stream groups. For instance, if MTV channel is extremely popular, the TV service provider or the system operator may decide to allot 5 replicated presentation streams to correspond to MTV channel whereas only 3 replicated presentation streams may be allotted to the less popular CC channel. The MPS generator 40 inserts appropriate ads into the avails of the replicated presentation streams according to the ad schedule provided by the ad scheduler 44. The ads that are inserted into the avails can be provided by the ad database 42 which may be stored in any type of storage unit, such as ROM, RAM, optical disks, magnetic disks, etc.

The plurality of presentation stream groups (e.g., 61a, 61b) are distributed from the MPS generator 40 to each of the routing stations 60, 60 through the distribution network 50, e.g., SDV, DBS, Internet, analog/cable TV, HFC, or wireless TV network such as LMDS (Local Multipoint Distribution System) or MMDS (Multichannel Multipoint Distribution System). The routing station 60 can reside at a STB or the like, or a USAM device depending on the type of television network system.

The operation of the routing station 60 may also vary slightly depending on the system type. For instance, if the system 100 is a digital/analog cable system or a satellite system such as DBS, the routing station 60 may reside at a STB or the like and receive the plurality of presentation stream groups. Only in response to a channel selection by the viewer, the routing station 60 detects an upcoming avail for the selected channel and selects a presentation stream from the presentation stream group corresponding to the selected channel which is carrying the most appropriate upcoming ad for the viewer. The most appropriate ad may be an ad directed to a market segment that best matches the market segment characteristics or demographics of the viewer or viewer's household. The selected presentation stream is then displayed to the viewer on a monitor.

If the system is an SDV system, the routing station 60 may reside at a Universal Service Access Multiplexer (USAM) device. The routing station 60 in the USAM device receives the plurality of presentation stream groups. In response to a particular channel selection by a viewer, the STB located at the viewer's household generates a channel request to the USAM device serving that STB. Only in response to this request, the routing station 60 in that USAM device selects one of the presentation streams from the presentation stream group corresponding to the requested channel which is carrying the most appropriate upcoming ad for the viewer. The routing station 60 delivers the selected presentation stream to the STB which in turn displays the presentation stream on the viewer's display device.

In all these systems, "forced" switching employed in the system of Applicant's co-pending application Ser. No. 09/750,800 is not needed to display targeted ads, because the ads have be scheduled based on the channel change statistics to compensate for the omission of "forced" switching.

Figure 8:
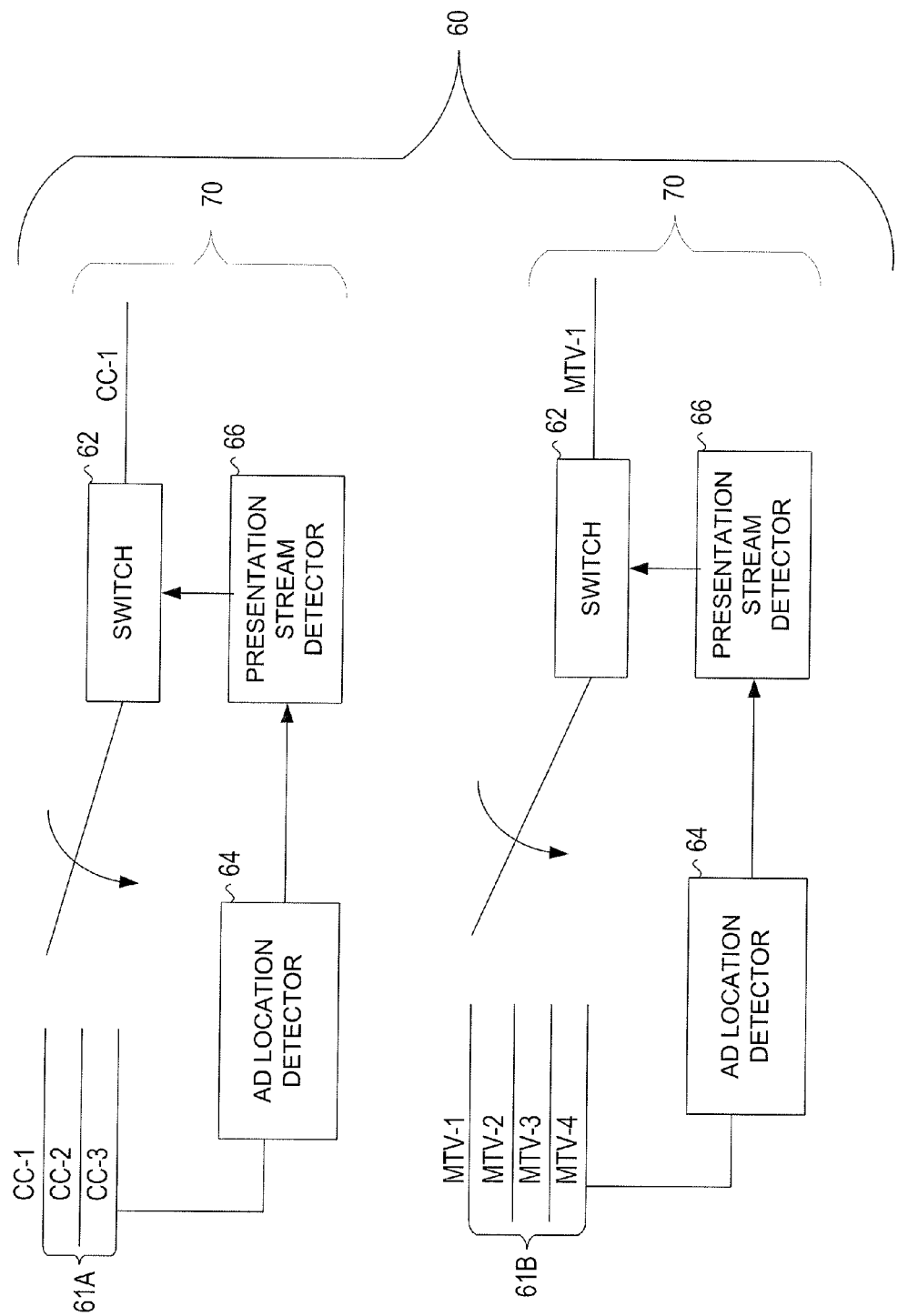
FIG. 8 is a block diagram of the routing station shown in FIG. 7.

FIG. 8 illustrates a block diagram of the routing station 60 in FIG. 7 in accordance with the present invention. Each routing station 60 is assigned with certain demographic or other characteristics based on the characteristics of the individual subscriber or group of subscribers served by the routing station 60. This characteristic information may be pre-stored at the routing station 60 or other locations, or may be frequently transferred to the routing station 60 from the head end of the system 100.

As illustrated in FIG. 8, each routing station 60 includes a plurality of routing units 70,70 each being responsible for processing one presentation stream group corresponding to a particular programming channel. For instance, the first routing unit 70 receives the first presentation stream group 61a corresponding to "Comedy Central" programming channel, whereas the second routing unit 70 receives the second presentation stream group 61b corresponding to "MTV" programming channel. Each of the routing units 70 includes a switch 62, an ad location detector 64, and a presentation stream selector 66, all operatively coupled.

In response to a channel selection request from a viewer (subscriber), only the routing unit 70 responsible for the requested channel is activated. The ad location detector 64 in the active routing unit 70 detects ad locations (e.g., using cue tones or avail time) in the received presentation streams to determine where the upcoming ads may be located. Since all the presentation streams in a presentation stream group have the same programming data and the same avails at the same locations, it is only necessary to monitor one presentation stream in a presentation stream group to detect ad locations for all presentation streams in that group.

PCT Patent Publication No. WO 99/66719, the disclosure of which is incorporated herein by reference, discloses several methods of detecting ad locations, such as detecting the black frames which television programmers typically provide in the video stream at the beginning of a television commercial avail. These methods may be utilized in the present invention to detect the ad locations. In another embodiment, digital cue tones set by DVS-253 digital video standards promulgated by the Society of Cable and Television Engineers (SCTE), which indicate start of avails, may be used. In still another embodiment, well-known analog cue tones embedded within the vertical blanking interval of a television signal, may be used.

The ad location detector 64 in the active routing unit 70 outputs a detection signal to the presentation stream selector 66 when the upcoming ad location is detected. In response to the detection signal, the presentation stream selector 66 determines which one of the presentation streams in the presentation stream group is carrying an upcoming ad directed to the market segment that best matches the market segment characteristics or demographics of the viewer served by the routing station 60. According to this determination, the selector 66 generates a switching signal to the switch 62 to select the identified presentation stream. Based on the switching signal, the switch 62 selects the identified presentation stream and outputs it. The output presentation stream may be delivered to a STB in SDV systems, or displayed on a monitor (e.g., a TV) in digital/analog cable and DBS systems.

In determining which presentation stream to select, the presentation stream selector 66 may examine a table or list of scheduled/inserted ads identifying which ads are inserted in which avails of the presentation streams of the group. This table may further identify market segment(s) associated with each scheduled ad. The table may be provided to the selector 66 by the ad scheduler 44 through the distribution network 50 or by a server on the network 50.

From the table of scheduled ads, the selector 66 determines a list of ads inserted in the upcoming avails of the presentation streams and identify the market segment assigned to each of these ads/avails. The selector 66 then compares these market segments with the demographics or other characteristics assigned to the routing station 60. If there is only one match, then the selector 66 instructs the switch 62 to switch to the presentation stream carrying the ad/avail corresponding to that matched market segment. If there is more than one match, then the selector 66 may select one market segment according to some predetermined criteria and generate a switching signal to the switch 62 to select the presentation stream carrying the ad/avail corresponding to the selected market segment. In the alternative, other schemes (e.g., random selection) may be used to select only one of the matched market segments. If there is no match, or a match with a below-threshold correlation level, the selector 62 may select a pre-designated default presentation stream in the presentation stream group as the most appropriate presentation stream, or other selection scheme can be used to select one of the presentation streams in the presentation stream group.

It should be understood that the components shown in FIG. 8 represent functional aspects of the routing station 60 and that each of these components may be implemented using analog circuits and/or digital circuits, including finite state machines, digital signal processors, computers, central processing units, application specific integrated circuits (ASICs), and programmed general purpose processors.

In accordance with certain embodiments where the television service delivery system is an SDV system or other system that does not use cue tones, and where avails may not fall exactly on the scheduled times, the switching between replicated presentation streams can be performed based on a time range encompassing the expected/scheduled avail time and the ad insertion window(s) to ensure a smooth and continuous display. In these embodiments, an exemplary table such as one shown in FIG. 9 may be used by the routing station 60 to select appropriate presentation streams. This table may identify avail time range, scheduled/inserted ads, and market segment(s) associated with each ad. In one embodiment, the avail time range may correspond to the end of the ad insertion window of a previous ad and the end of the ad insertion window of the current ad. If the ad insertion windows overlap, the avail time range may start or end at the mid point of the overlap. Further, this table may include UPCIs (User Perceived Channel Indicators) and corresponding BpIDs (Broadcast Program IDS) typically used in SDV systems.

The use of the table in FIG. 9 can be as follows. If a viewer changes a channel to MTV (UPCI 05) during the avail time range, e.g., from 20:01:00 to 20:18:00 during which an avail/ad is expected, the table is searched for an entry that matches the UPCI (i.e., UPCI 05) for the given time. The search results in multiple hits, e.g., E1-E3. Then the market segments assigned to the ads in these entries E1-E3 are compared with the market segment characteristics assigned to the viewer's STB (e.g., identifiable by the MAC ID) to select the most appropriate presentation stream for the viewer. For instance, assuming that the viewer has been assigned to a "college" market segment, the comparison results will indicate that the entry E1 is the most appropriate since it has the "College or Wealthy" market segment characteristics. If no match is found, however, one of the hit entries E1-E3 may be selected randomly, or a default entry may be selected. If more than one match is found, certain priority criteria or any other scheme may be used to narrow the multiple hit entries into one that is best suitable for the current viewer. Once the most appropriate entry (e.g., E1) has been identified, then the BpID of the identified entry (e.g., 178) is used to output the presentation stream (data) corresponding to that BpID for viewing by the viewer.

As discussed above, in some embodiments, the market segments of the present invention may include a "default" segment for capturing any subscriber or subscriber group that does not fall into any of the defined segments. Any number of market segments may be created in accordance with system feasibility. The market segments may not need to encompass all subscribers on the network. It is also possible that some subscribers or groups of subscribers may fall into more than one market segment of a particular advertiser. In those cases, certain priority schemes or other schemes may be used to match the subscriber or group of subscribers to one advertiser-specific market segment, if that is desired.

Thus, the present invention provides a system and method for scheduling advertisements into the avails of presentation stream groups based on channel change statistics and avail time information. This allows the system to perform presentation stream switching only in response to channel selection requests from subscribers. Thus, "forced" switching can be omitted and targeted advertising using advertiser-specific market segments are achieved. Accordingly, effective targeted television advertising can be achieved.

The invention has been thus described with respect to delivering targeted ads to the subscribers on a television service network. However, it should be understood by persons of skill in the art that the invention can be used to delivery other data. Furthermore, the principles of scheduling advertisements for insertion into the avails using channel change statistics and avail times can be applied to any other system which requires the insertion of ads directed to different advertiser-specific market segments into a presentation stream. Moreover, instead of providing a plurality of routing units each responsible for a different presentation stream group, it is possible to provide one routing unit that is responsible for all presentation stream groups.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed:

1. A system for delivering targeted advertisements to subscribers in a television service network environment, the system comprising:
   a multiple presentation stream generator for generating a plurality of presentation stream groups each group corresponding to a particular programming channel, each of the presentation stream groups comprising a plurality of replicated presentation streams having the same programming and the same avails; and
   an ad scheduler for scheduling advertisements in each of the replicated presentation streams, wherein the ad scheduler determines an appropriate market segment for the avails within the replicated presentation streams based on a comparison between channel change statistical information and avail time information.

2. The system of claim 1, further comprising:
   at least one routing station for receiving the plurality of presentation stream groups from the multiple presentation stream generator; and
   a delivery network, coupled to the generator and the at least one routing station, for delivering the plurality of presentation stream groups from the multiple presentation stream generator to the routing station.

3. The system of claim 2, wherein the routing station includes a plurality of routing units each responsible for receiving one of the plurality of presentation stream groups, wherein one of the routing units selectively switches between the presentation streams in the presentation stream group for which it is responsible in response to a channel change request from a subscriber served by the routing station.

4. The system of claim 3, wherein each of the routing units includes:
   an ad location detector for detecting advertisement locations for said presentation stream group in response to the channel request, and for generating a detection signal in response to said detection;
   a selector, coupled to the detector, for selecting one of the presentation streams in said presentation stream group that is most appropriate for the subscriber in response to the detection signal, and generating a switching signal corresponding to said selection; and
   a switch, coupled to the selector, for switching to the selected one of the presentation streams in said presentation stream group in response to the switching signal.

5. The system of claim 1, wherein the ad scheduler selects an advertisement for insertion into the respective avails based on the determined market segment.

6. The system of claim 1, wherein the channel change statistical information is determined by collecting channel change data from a group of subscribers and performing statistical calculations on the collected channel change data.

7. A method of delivering targeted advertisements to subscribers in a television service network environment, the method comprising:
   generating a plurality of presentation stream groups, each group corresponding to a particular programming channel, each of the presentation stream groups comprising a plurality of replicated presentation streams having the same programming and the same avails;
   determining, based on a comparison between channel change statistical information and avail time information, an appropriate market segment for the avails within the replicated presentation streams; and
   scheduling advertisements in each of the replicated presentation streams.

8. The method of claim 7, further comprising:
   transmitting the plurality of presentation stream groups to at least one local routing station; and
   delivering to a subscriber, via the routing station, one of the presentation streams in the presentation stream group corresponding to a channel request from the subscriber.

9. The method of claim 8, wherein the delivering includes:
   detecting advertisement locations in said presentation stream group corresponding to the requested channel in response to the channel request;
   generating a detection signal responsive to said detection;
   determining, responsive to the detection signal, which one of the presentation streams in said presentation stream group is most appropriate for the subscriber; and
   delivering the most appropriate presentation stream to the subscriber based on said determination.

10. The method of claim 7, wherein the scheduling of advertisements includes selecting an advertisement for insertion into the respective avails based on the determined market segment.

11. The method of claim 7, wherein the channel change statistical information is determined by collecting channel change data from a group of subscribers and performing statistical calculations on the collected channel change data.

12. A method of switching presentation streams carrying targeted advertisements to a user in a switched television service network environment, the method comprising:
   receiving a channel change request from a user, wherein the user is assigned a market segment;
   switching to a first presentation stream corresponding to the market segment of the user in response to the channel change request, wherein the first presentation stream is selected from a set of presentation streams corresponding to a programming channel having programming, each of the presentation streams in the set corresponding to a different one of a plurality of market segments, each of the presentation streams in the set carrying the same programming as the programming channel and at least one advertisement directed to the market segment to which the presentation stream corresponds;
   monitoring channel changes of the user;
   determining that a channel change did not occur within a specified time period; and
   switching to a second presentation stream selected from the set of presentation streams if a channel change did not occur, wherein the second presentation stream corresponds to the market segment of the user.

13. The method of claim 12, wherein the set of presentation streams corresponding to each programming channel are generated by replicating an original programming stream corresponding to the associated programming channel.

14. The method of claim 13, wherein the replicating occurs at a headend.

15. The method of claim 13, wherein the number of presentation streams generated for each set of presentation streams is equal to the number of market segments.

* * * * *